May 25, 1926.  
L. MAYER  
1,586,209  
SNOW ATTACHMENT FOR AUTOMOTIVE VEHICLES  
Filed Nov. 24, 1924  2 Sheets-Sheet 2
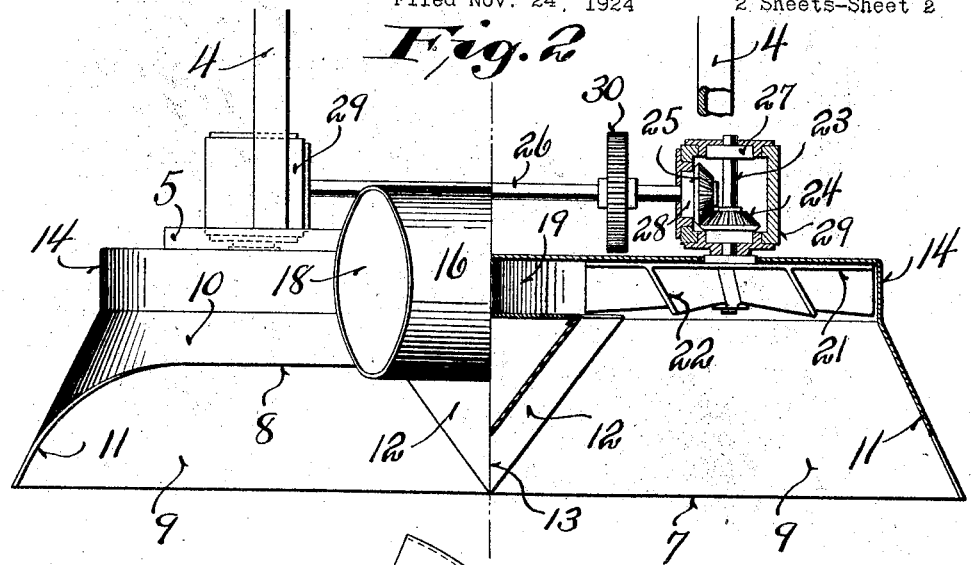
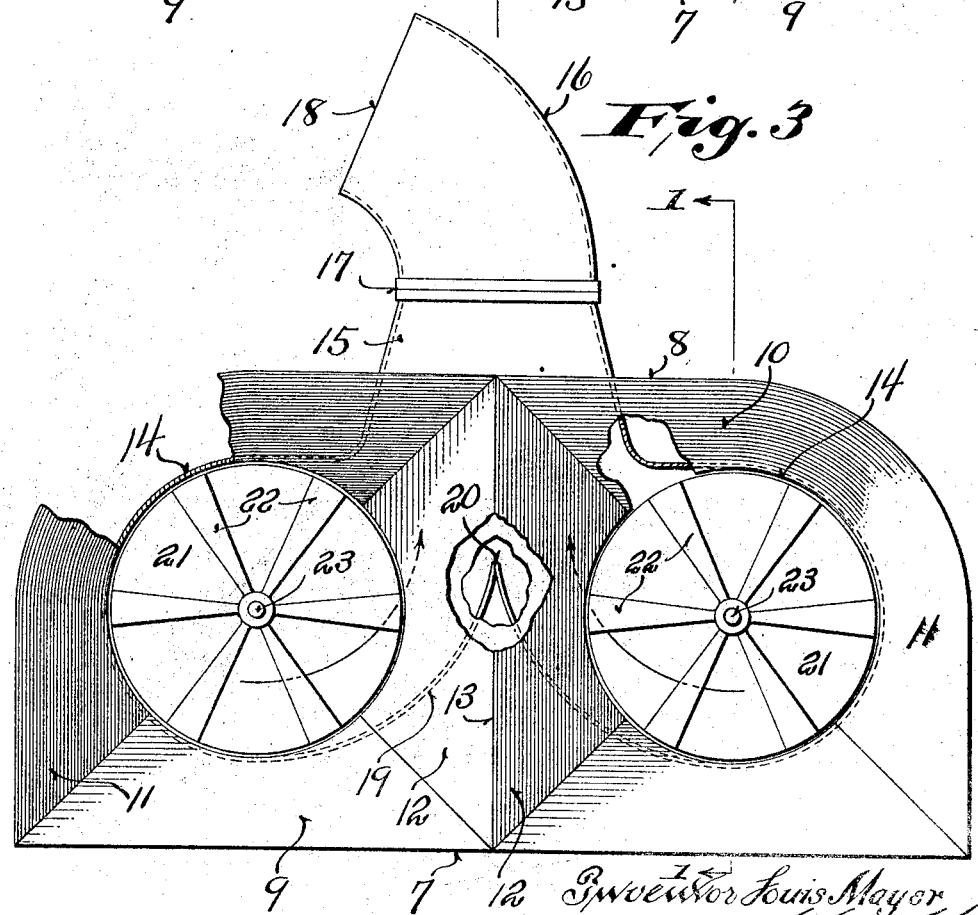

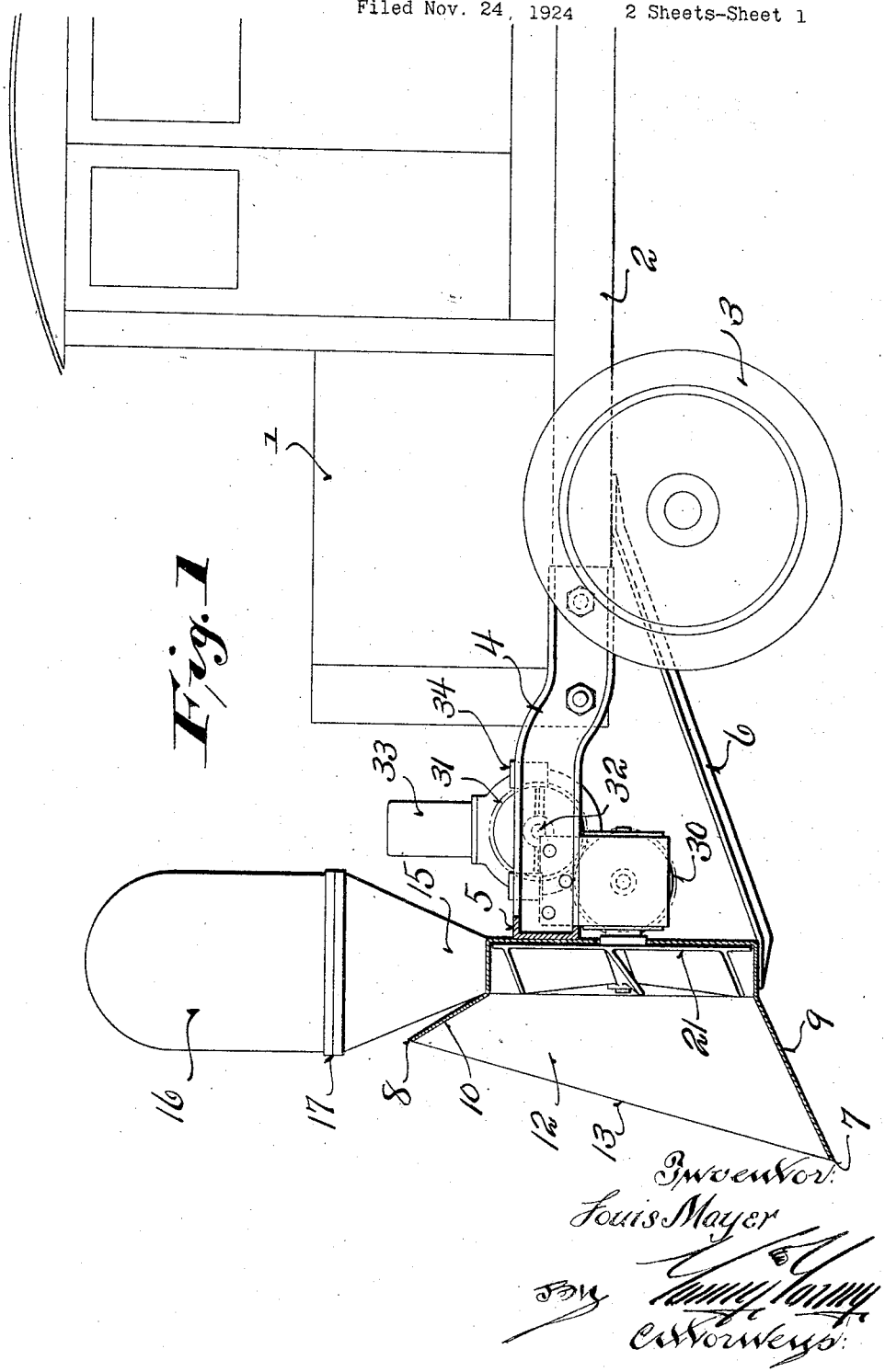

Patented May 25, 1926.

1,586,209

UNITED STATES PATENT OFFICE.

LOUIS MAYER, OF KAUKAUNA, WISCONSIN.

SNOW ATTACHMENT FOR AUTOMOTIVE VEHICLES.

Application filed November 24, 1924. Serial No. 751,996.

This invention relates to a snow attachment for automotive vehicle such as tractors, trucks, and similar machines.

In removing snow and ice from roadways, various means have been employed, such as heavy automotive plows which force the snow aside and specially constructed machines for handling the snow, but these machines necessarily remained idle for a large portion of the time during the summer months and consequently a considerable waste resulted.

This invention is designed to provide a snow attachment which is a unitary device, and may be quickly attached to and removed from tractors, trucks and other automotive vehicles, which is relatively small and compact and does not require an extensive storage space when not in use, and which may be removed, as stated, from the automotive vehicle to permit the use of the vehicle in its usual capacities when not employed to carry the snow remover.

Further objects are to provide a snow remover which bodily gathers up the snow and throws it to the side of the roadway, which is so constructed that traveling belts, conveyors, and other devices of this type are wholly avoided, and in which a separate power plant or engine is provided for operating the snow remover and is carried by and forms a unitary portion of the snow remover.

An embodiment of the invention is shown in the accompanying drawings, in which:—

Figure 1 is an elevation partly in section showing the snow remover attached to the front of a tractor or truck such view corresponding to a section on the line 1—1 of Figure 3.

Figure 2 is a plan view partly in section of the snow remover.

Figure 3 is a front view with parts broken away for the sake of clearance of illustration.

Referring to the drawings, it will be seen that a conventional type of automotive vehicle 1 is illustrated and that the snow remover is shown as attached to the chassis or side frames 2 of the vehicle in advance of the front wheels 3 thereof. This snow remover comprises a pair of side channel irons 4 which are curved downwardly and bolted rigidly to the side bars 2 of the automotive vehicle. These channel irons 4 extend forwardly and provide the main support for the snow remover. They are attached at their forward ends to a transverse channel iron 5 (see Figure 2) which extends completely across the back of the snow remover and furnishes a very strong backing therefor. Elongated braces 6 are attached at their inner ends to the under side of the side bars 2 and at their outer ends to the body of the snow remover, as shown in Figure 1.

The snow remover is formed of heavy sheet iron and is roughly funnel shaped with a flat lower edge 7, as shown in Figure 3, and with a transverse upper edge 8. This sheet iron extends inwardly along the slanting faces 9 and 10 (see Figures 1 and 3). It is also provided with curved side walls which flare outwardly and join the bottom flaring wall 9, such side walls being indicated in Figures 2 and 3 by the reference character 11. Centrally of the snow remover a wedge like member is provided having the slanting faces 12, as shown in all three of the Figures. This wedge like member has a sharp front edge 13 which parts the incoming snow into two streams.

Immediately rearwardly of the funnel like front portion a pair of inset casings 14 are provided and open directly into the two sections of the funnel shaped portions, as clearly shown in Figures 1 and 2. These inset portions join a delivery channel or rectangular pipe 15 which flares upwardly, as shown in Figure 1, and which joins an upper rounded pipe 16. The pipe 16 may be swivelly joined to the pipe 15, as indicated at 17, and is provided with an open outer end 18 which may be turned towards either side of the roadway to deliver the discharged snow. It is to be noted, particularly from Figure 3, that the inset circular portions 14 are provided with upwardly converging curved walls 19 which join at a point 20 below the pipe 15 and thus provide guideways which merge gradually into each other.

A pair of rotary cutter fans are provided and are positioned within the inset portions 14. These fans, preferably comprise a circular disk back 21 (see Figures 1 and 2) from which a plurality of slanting radial vanes 22 extend. These fans or rotary cutter members are open at their peripheral portions, as clearly shown in Figures 1 and 2. The fans or rotary cutter members are adapted to rotate in opposite directions, as shown by the arrows in Figure 3, and it will be noted from a comparison of Figures 1 and 2 with Figure 3 that the angular setting of the vanes 22 permits their digging into or cutting into the incoming snow. Thus the snow is gathered by the blades 22 and is thrown outwardly, being guided by the walls 19. Further, these rapidly rotating fans create a positively outwardly flowing current of air which carries the snow with it up through the pipe 14 and the pipe 16 and projects such snow in a broken up condition outwardly from the pipe 16 to the side of the roadway.

Each of the fans is carried by a shaft 23 (see Figure 2) which is provided with a bevel gear 24. The bevel gears 24 mesh with the correspondingly bevel gears 25 carried by a transverse shaft 26. Preferably the shafts 23 and 26 are carried in roller bearings 27 and 28 respectively, and the gears 24 and 25 are mounted within protecting houses 29, as clearly shown in Figure 2.

The shaft 26 is provided with a gear 30 which meshes with a gear 31 (see Figure 1) carried by the shaft 32 of a gasoline engine 33. This engine is preferably provided with supporting channels or members which terminate in feet 34 resting upon and secured to the channel irons 4, as shown in Figure 1, to thus provide a brace for such channel irons and also an adequate and firm support for the motor 33.

It will be seen that a snow remover has been provided as a unitary attachment for automotive vehicles and that this snow remover may be most readily and quickly secured to conventional types of trucks, tractors and similar types of machines.

Further it will be seen that the snow remover is provided with a separate motor which rapidly drives the cutting fans and delivers the snow in a very effective manner to either side of the roadway as desired.

Further, it will be seen that the scoop shaped or funnel shaped gathering means cuts a wide swarth through the snow and provides ample clearance for the automotive vehicle.

It is to be particularly noted that the device is extremely simple and rugged and has few moving parts and is not likely to get out of order.

Although the invention has been described in considerable detail, it is to be understood that the invention may be variously embodied and is, therefore, to be limited only as claimed.

I claim:

The combination of an automotive vehicle provided with side frame bars, of a snow remover having a scoop-like forward portion provided with a central parting wedge, a pair of supporting bars secured to said side frame bars and extending forwardly to said scoop-like portion, a transverse bar secured to said supporting bars and to said scoop-like portion, braces joining the lower portion of said scoop-like member with said side frame bars, said scoop-like member having circular inset portions at its rear side, a pair of fans located within said inset portions and having radially located vanes slanting towards their leading edges, a pair of guide walls extending from said inset portion and converging, a delivery pipe located above said guide walls and fed from said fans, and having a laterally directed delivery portion, shafts rigidly secured to said fans and projecting rearwardly, a transverse shaft geared to said first mentioned shafts, and a driving motor geared to said transverse shaft and supported from said supporting bars.

In testimony that I claim the foregoing I have hereunto set my hand at Kaukauna, in the county of Outagamie and State of Wisconsin.

LOUIS MAYER.